(12) United States Patent
Soejima

(10) Patent No.: US 9,921,882 B2
(45) Date of Patent: Mar. 20, 2018

(54) INFORMATION PROCESSING SYSTEM, DEPLOYMENT METHOD, PROCESSING DEVICE, AND DEPLOYMENT DEVICE

(71) Applicant: NEC Corporation, Minato-ku, Tokyo (JP)

(72) Inventor: Kenji Soejima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 235 days.

(21) Appl. No.: 14/782,374

(22) PCT Filed: Apr. 15, 2014

(86) PCT No.: PCT/JP2014/002127
§ 371 (c)(1),
(2) Date: Oct. 5, 2015

(87) PCT Pub. No.: WO2014/171130
PCT Pub. Date: Oct. 23, 2014

(65) Prior Publication Data
US 2016/0034315 A1    Feb. 4, 2016

(30) Foreign Application Priority Data

Apr. 17, 2013  (JP) ................................. 2013-086679

(51) Int. Cl.
*G06F 9/46*      (2006.01)
*G06F 9/50*      (2006.01)
(Continued)

(52) U.S. Cl.
CPC .............. *G06F 9/5038* (2013.01); *G06F 8/61* (2013.01); *G06F 8/71* (2013.01); *G06F 9/542* (2013.01)

(58) Field of Classification Search
CPC . G06F 9/5038; G06F 8/61; G06F 8/71; G06F 9/542
See application file for complete search history.

(56) References Cited

U.S. PATENT DOCUMENTS

2009/0007095 A1    1/2009  Alverson et al.
2010/0333084 A1   12/2010  Dehaan
(Continued)

FOREIGN PATENT DOCUMENTS

JP    2009-026015 A    2/2009
JP    2012-048410 A    3/2012
(Continued)

OTHER PUBLICATIONS

"Puppet Enterprise: IT Automation Software for System Administrators", Puppet Labs, Online, <URL: https://puppetlabs.com/puppet/>, retrieved on Apr. 8, 2013.
(Continued)

*Primary Examiner* — James J Lee

(57) ABSTRACT

An objective of the present invention is to construct a system in which a plurality of software components having dependencies are deployed dispersedly on a plurality of processing devices.
The information system includes a deployment device (100) and a plurality of processing devices (200). A scheduler (210) of the processing device (200) determine whether there is a deployment task satisfying an execution condition in task information (231) on the basis of a termination event of a deployment task. When there is a deployment task satisfying the execution condition, the scheduler (210) executes the deployment task and transmits a termination event of the deployment task to the deployment device (100). An event processing unit (130) of the deployment device (100) transmits the termination event of the deployment task to a notification destination processing device (200) referring to event information (141).

7 Claims, 13 Drawing Sheets

(51) Int. Cl.
G06F 9/445 (2018.01)
G06F 9/44 (2018.01)
G06F 9/54 (2006.01)

(56) References Cited

U.S. PATENT DOCUMENTS

| | | | | |
|---|---|---|---|---|
| 2011/0246998 | A1* | 10/2011 | Vaidya | G06F 9/4881 |
| | | | | 718/103 |
| 2011/0321051 | A1* | 12/2011 | Rastogi | G06F 9/4881 |
| | | | | 718/102 |
| 2012/0198438 | A1 | 8/2012 | Auer | |
| 2013/0232497 | A1* | 9/2013 | Jalagam | G06F 9/5072 |
| | | | | 718/104 |
| 2013/0232498 | A1* | 9/2013 | Mangtani | G06F 9/5072 |
| | | | | 718/104 |

FOREIGN PATENT DOCUMENTS

| | | | |
|---|---|---|---|
| WO | 2006/043320 | A1 | 4/2006 |
| WO | 2006/080069 | A1 | 8/2006 |
| WO | 2010/095579 | A1 | 8/2010 |

OTHER PUBLICATIONS

International Search Report for PCT Application No. PCT/JP2014/002127, dated Jul. 15, 2014.
English translation of Written opinion for PCT Application No. PCT/JP2014/002127. dated Jul. 15, 2014.

* cited by examiner

Fig. 5

121 TASK INFORMATION

| DEPLOYMENT TASK | PROCESSING DEVICE | TASK STATE | PROCESSING CONTENT | EXECUTION CONDITION (DEPENDENT TASK) |
|---|---|---|---|---|
| T1 | A | EXECUTED | INSTALL C1 | -- |
| T2 | A | UNEXECUTED | INSTALL C2 | -- |
| T3 | A | UNEXECUTED | INSTALL C3 | -- |
| T4 | B | UNEXECUTED | INSTALL C4 | T1 |
| T5 | B | UNEXECUTED | INSTALL C5 | T2 |
| T6 | B | EXECUTED | INSTALL C6 | -- |
| T7 | C | EXECUTED | INSTALL C7 | -- |
| T8 | C | UNEXECUTED | INSTALL C8 | T5, T6 |
| T9 | C | UNEXECUTED | INSTALL C9 | -- |

Fig. 6

141 EVENT INFORMATION

| DEPLOYMENT TASK | NOTIFICATION DESTINATION |
|---|---|
| T1 | B |
| T2 | B |
| T5 | C |
| T6 | C |

Fig. 7

231 TASK INFORMATION (PROCESSING DEVICE A)

| DEPLOYMENT TASK | TASK STATE | PROCESSING CONTENT | EXECUTION CONDITION (DEPENDENT TASK) | DEPENDENT TASK STATE |
|---|---|---|---|---|
| T1 | EXECUTED | INSTALL C1 | -- | -- |
| T2 | UNEXECUTED | INSTALL C2 | -- | -- |
| T3 | UNEXECUTED | INSTALL C3 | -- | -- |

Fig. 8

231 TASK INFORMATION (PROCESSING DEVICE B)

| DEPLOYMENT TASK | TASK STATE | PROCESSING CONTENT | EXECUTION CONDITION (DEPENDENT TASK) | DEPENDENT TASK STATE |
|---|---|---|---|---|
| T4 | UNEXECUTED | INSTALL C4 | T1 | EXECUTED |
| T5 | UNEXECUTED | INSTALL C5 | T2 | UNEXECUTED |
| T6 | EXECUTED | INSTALL C6 | -- | -- |

Fig. 9

231 TASK INFORMATION (PROCESSING DEVICE C)

| DEPLOYMENT TASK | TASK STATE | PROCESSING CONTENT | EXECUTION CONDITION (DEPENDENT TASK) | DEPENDENT TASK STATE |
|---|---|---|---|---|
| T7 | EXECUTED | INSTALL C7 | -- | -- |
| T8 | UNEXECUTED | INSTALL C8 | T5 | UNEXECUTED |
|  |  |  | T6 | EXECUTED |
| T9 | UNEXECUTED | INSTALL C9 | -- | -- |

Fig. 14

121 TASK INFORMATION

| DEPLOYMENT TASK | PROCESSING DEVICE | TASK STATE | PROCESSING CONTENT | EXECUTION CONDITION (DEPENDENT TASK) | PRIORITY |
|---|---|---|---|---|---|
| T1 | A | EXECUTED | INSTALL C1 | — | 2 |
| T2 | A | UNEXECUTED | INSTALL C2 | — | 3 |
| T3 | A | UNEXECUTED | INSTALL C3 | — | 1 |
| T4 | B | UNEXECUTED | INSTALL C4 | T1 | 1 |
| T5 | B | UNEXECUTED | INSTALL C5 | T2 | 2 |
| T6 | B | EXECUTED | INSTALL C6 | — | 2 |
| T7 | C | EXECUTED | INSTALL C7 | — | 1 |
| T8 | C | UNEXECUTED | INSTALL C8 | T5, T6 | 1 |
| T9 | C | UNEXECUTED | INSTALL C9 | — | 1 |

Fig. 15

231 TASK INFORMATION (PROCESSING DEVICE A)

| DEPLOYMENT TASK | TASK STATE | PROCESSING CONTENT | EXECUTION CONDITION (DEPENDENT TASK) | DEPENDENT TASK STATE | PRIORITY |
|---|---|---|---|---|---|
| T1 | EXECUTED | INSTALL C1 | -- | -- | 2 |
| T2 | UNEXECUTED | INSTALL C2 | -- | -- | 3 |
| T3 | UNEXECUTED | INSTALL C3 | -- | -- | 1 |

Fig. 16

231 TASK INFORMATION (PROCESSING DEVICE B)

| DEPLOYMENT TASK | TASK STATE | PROCESSING CONTENT | EXECUTION CONDITION (DEPENDENT TASK) | DEPENDENT TASK STATE | PRIORITY |
|---|---|---|---|---|---|
| T4 | UNEXECUTED | INSTALL C4 | T1 | EXECUTED | 1 |
| T5 | UNEXECUTED | INSTALL C5 | T2 | UNEXECUTED | 2 |
| T6 | EXECUTED | INSTALL C6 | -- | -- | 2 |

Fig. 17

231 TASK INFORMATION (PROCESSING DEVICE C)

| DEPLOYMENT TASK | TASK STATE | PROCESSING CONTENT | EXECUTION CONDITION (DEPENDENT TASK) | DEPENDENT TASK STATE | PRIORITY |
|---|---|---|---|---|---|
| T7 | EXECUTED | INSTALL C7 | -- | -- | 1 |
| T8 | UNEXECUTED | INSTALL C8 | T5 | UNEXECUTED | 1 |
| | | | T6 | EXECUTED | |
| T9 | UNEXECUTED | INSTALL C9 | -- | -- | 1 |

INFORMATION PROCESSING SYSTEM, DEPLOYMENT METHOD, PROCESSING DEVICE, AND DEPLOYMENT DEVICE

This application is a National Stage Entry of PCT/JP2014/002127 filed on Apr. 15, 2014, which claims priority from Japanese Patent Application 2013-086679 filed on Apr. 17, 2013, the contents of all of which are incorporated herein by reference, in their entirety.

TECHNICAL FIELD

The present invention relates to an information processing system, a deployment method, a processing device, and a deployment device for deploying software components such as middleware and the like configuring an IT (Information Technology) system.

BACKGROUND ART

Over recent years, software components such as middleware and the like configuring an IT system have been diversified, and therefore, in use thereof, extensive specialized knowledge is needed. Similarly, for the construction and setting of a system using these software components, high specialty is needed, resulting in an increase in operation cost. To solve such situations, methods for automatically constructing and setting a system have been devised.

For example, PTL 1 describes a technique for defining dependencies among a plurality of software components configuring a system and controlling an activation sequence of the software components on the basis of the dependencies. In the technique of PTL 1, a multifunctional machine (processing device) determines an activation sequence for respective software components on the basis of weighted dependency information indicating a lower component on which each of the software components configuring the system depends.

When a system in which there are dependencies among a plurality of software components is constructed, a deployment sequence for respective software components needs to be determined on the basis of the dependencies. When the technique described in PTL 1 is applied to the deployment of software components upon constructing such a system, it is possible to control the construction of the system without defining a complex workflow by the user.

As a related technique, PTL 2 discloses a technique for determining a server to which each component to be deployed when a group of components are deployed on a group of deployment candidate servers. In this technique, execution conditions of the group of components are transmitted to each deployment candidate server, and the each deployment candidate server determines whether each component is executable. PTL 3 discloses a technique for determining a task processing device that executes each task among candidate task processing devices when a plurality of task processing devices execute a job flow in which a plurality of tasks are combined. NPL 1 discloses software for constructing an IT system.

CITATION LIST

Patent Literature

[PTL 1] Japanese Patent Application Laid-Open Publication No. 2012-048410
[PTL 2] International Publication No. WO2010/095579
[PTL 3] Japanese Patent Application Laid-Open Publication No. 2009-026015

Non Patent Literature

[NPL 1] "Puppet Enterprise: IT Automation Software for System Administrators", Puppet Labs, [Online], [retrieved on Apr. 8, 2013], the Internet <URL: https://puppetlabs.com/puppet/>

SUMMARY OF INVENTION

Technical Problem

A recent IT system has become complex and large-scale, and a plurality of software components configuring a system are deployed dispersedly on a plurality of processing devices. However, the technique described in PTL 1 is applied to a system in which a plurality of software components having dependencies are deployed on one processing device, it is difficult to apply the technique to a system in which a plurality of software components are deployed dispersedly on a plurality of processing devices.

An object of the present invention is to provide an information processing system, a deployment method, a processing device, and a deployment device capable of solving the above problems and constructing a system in which a plurality of software components having dependencies are deployed dispersedly on a plurality of processing devices.

Solution to Problem

An information processing system according to an exemplary aspect of the invention includes: a plurality of processing devices each including a task information storing means for storing task information that indicates, for each of identifiers of one or more deployment tasks to be executed on the processing device among a plurality of deployment tasks for deploying a plurality of software components of a system respectively, an execution condition including an identifier of another deployment task to be executed before executing the deployment task, the plurality of deployment tasks being executed in the plurality of processing devices on which the plurality of software components are deployed, and a scheduler means for determining whether there is a deployment task satisfying the execution condition among the one or more deployment tasks included in the task information on the basis of a termination event of a deployment task received from a deployment device, executing, when there is a deployment task satisfying the execution condition, the deployment task, and transmitting, when the deployment task is terminated, a termination event of the deployment task to the deployment device; and the deployment device including an event information storing means for storing event information that indicates, for each of identifiers of the plurality of deployment tasks, an identifier of a processing device to which a termination event of the deployment task is to be transmitted, and an event processing means for transmitting, when receiving a termination event of a deployment task from any one of the plurality of processing devices, the received termination event to a processing device to which the termination event of the deployment task is to be transmitted, referring to the event information.

An deployment method according to an exemplary aspect of the invention includes: in each of a plurality of processing devices on which a plurality of software components of a system are deployed, storing task information that indicates, for each of identifiers of one or more deployment tasks to be executed on the processing device among a plurality of deployment tasks for deploying the plurality of software components respectively, an execution condition including an identifier of another deployment task to be executed before executing the deployment task, in a deployment device, storing event information that indicates, for each of identifiers of the plurality of deployment tasks, an identifier of a processing device to which a termination event of the deployment task is to be transmitted, in each of the plurality of processing devices, determining whether there is a deployment task satisfying the execution condition among the one or more deployment tasks included in the task information on the basis of a termination event of a deployment task received from a deployment device, executing, when there is a deployment task satisfying the execution condition, the deployment task, and transmitting, when the deployment task is terminated, a termination event of the deployment task to the deployment device; and in the deployment device, transmitting, when receiving a termination event of a deployment task from any one of the plurality of processing devices, the received termination event to a processing device to which the termination event of the deployment task is to be transmitted, referring to the event information.

A processing device according to an exemplary aspect of the invention includes: a task information storing means for storing task information that indicates, for each of identifiers of one or more deployment tasks to be executed on the processing device among a plurality of deployment tasks for deploying a plurality of software components of a system respectively, an execution condition including an identifier of another deployment task to be executed before executing the deployment task, the plurality of deployment tasks being executed in the plurality of processing devices on which the plurality of software components are deployed, and a scheduler means for determining whether there is a deployment task satisfying the execution condition among the one or more deployment tasks included in the task information on the basis of a termination event of a deployment task received from a deployment device which transmits a termination event of a deployment task received from any one of the plurality of processing devices to another processing device, executing, when there is a deployment task satisfying the execution condition, the deployment task, and transmitting, when the deployment task is terminated, a termination event of the deployment task to the deployment device.

A deployment device according to an exemplary aspect of the invention includes: an event information storing means for storing event information that indicates, for each of identifiers of a plurality of deployment tasks for deploying a plurality of software components, an identifier of a processing device to which a termination event of the deployment task is to be transmitted, the plurality of deployment tasks being executed in a plurality of processing devices on which the plurality of software components are deployed; and an event processing means for transmitting, when receiving a termination event of a deployment task from any one of the plurality of processing devices each of which executes a deployment task satisfying an execution condition indicating another deployment task to be executed before executing the deployment task on the basis of a termination event of a deployment task received from the deployment device, the received termination event to a processing device to which the termination event of the deployment task is to be transmitted, referring to the event information.

A first computer readable storage medium according to an exemplary aspect of the invention records thereon a program, causing a computer to function as a processing device including: a task information storing means for storing task information that indicates, for each of identifiers of one or more deployment tasks to be executed on the processing device among a plurality of deployment tasks for deploying a plurality of software components of a system respectively, an execution condition including an identifier of another deployment task to be executed before executing the deployment task, the plurality of deployment tasks being executed in the plurality of processing devices on which the plurality of software components are deployed, and a scheduler means for determining whether there is a deployment task satisfying the execution condition among the one or more deployment tasks included in the task information on the basis of a termination event of a deployment task received from a deployment device which transmits a termination event of a deployment task received from any one of the plurality of processing devices to another processing device, executing, when there is a deployment task satisfying the execution condition, the deployment task, and transmitting, when the deployment task is terminated, a termination event of the deployment task to the deployment device.

A second computer readable storage medium according to an exemplary aspect of the invention records thereon a program, causing a computer to function as a processing device including: an event information storing means for storing event information that indicates, for each of identifiers of a plurality of deployment tasks for deploying a plurality of software components, an identifier of a processing device to which a termination event of the deployment task is to be transmitted, the plurality of deployment tasks being executed in a plurality of processing devices on which the plurality of software components are deployed; and an event processing means for transmitting, when receiving a termination event of a deployment task from any one of the plurality of processing devices each of which executes a deployment task satisfying an execution condition indicating another deployment task to be executed before executing the deployment task on the basis of a termination event of a deployment task received from the deployment device, the received termination event to a processing device to which the termination event of the deployment task is to be transmitted, referring to the event information.

Advantageous Effects of Invention

An advantageous effect of the present invention is to construct a system in which a plurality of software components having dependencies are deployed dispersedly on a plurality of processing devices.

BRIEF DESCRIPTION OF DRAWINGS

FIG. 5 is a diagram illustrating an example of task information 121 in the first exemplary embodiment of the present invention.

FIG. 6 is a diagram illustrating an example of event information 141 in the first exemplary embodiment of the present invention.

FIG. 7 is a diagram illustrating an example of task information 231 in the first exemplary embodiment of the present invention.

FIG. 8 is a diagram illustrating another example of the task information 231 in the first exemplary embodiment of the present invention.

FIG. 9 is a diagram illustrating still another example of the task information 231 in the first exemplary embodiment of the present invention.

FIG. 14 is a diagram illustrating an example of task information 121 in the second exemplary embodiment of the present invention.

FIG. 15 is a diagram illustrating an example of task information 231 in the second exemplary embodiment of the present invention.

FIG. 16 is a diagram illustrating another example of the task information 231 in the second exemplary embodiment of the present invention.

FIG. 17 is a diagram illustrating still another example of the task information 231 in the second exemplary embodiment of the present invention.

DESCRIPTION OF EMBODIMENTS

First Exemplary Embodiment

A first exemplary embodiment of the present invention will be described.

Initially, a configuration of the first exemplary embodiment of the present invention will be described.

Figure 2:
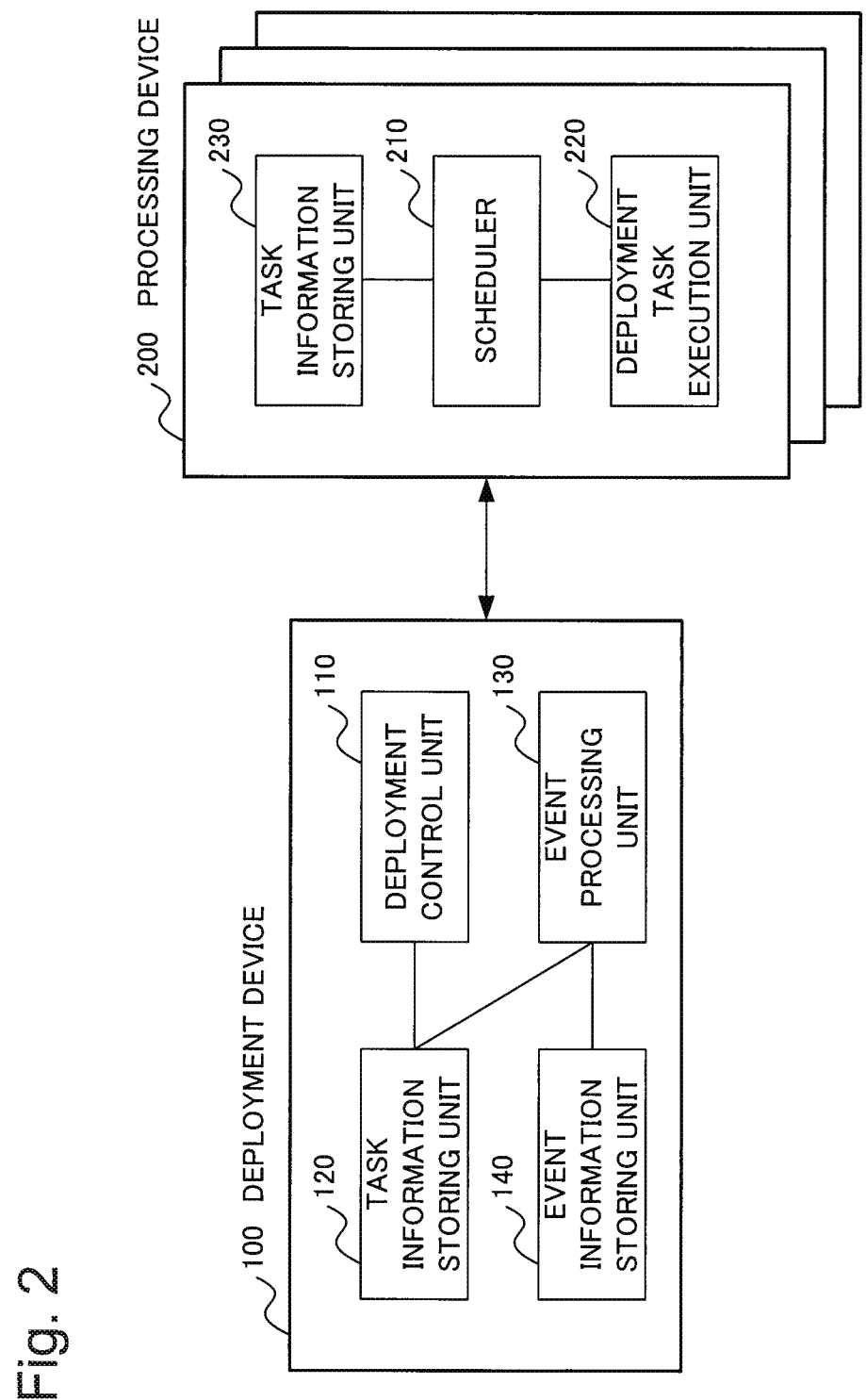
FIG. 2 is a block diagram illustrating a configuration of an information processing system in the first exemplary embodiment of the present invention.

FIG. 2 is a block diagram illustrating a configuration of an information processing system (hereinafter, referred to also as a deployment system) in the first exemplary embodiment of the present invention.

Referring to FIG. 2, the deployment system includes a deployment device 100 and a plurality of processing devices 200.

The deployment device 100 constructs a system by deploying each of a plurality of software components (hereinafter, referred to simply as components) configuring an IT system to any one of the plurality of processing devices 200. The component refers to a program module such as an operating system (OS), middleware (MW), an application (AP), and the like. The deployment of the component means installing the component on the processing device 200 and configuring the installed component.

The processing device 200 is a computer that executes processing of each component configuring a system. The processing device 200 deploys each component using a deployment task of the each component. The processing device 200 may be a virtual machine (VM) constructed on the computer.

Figure 3:
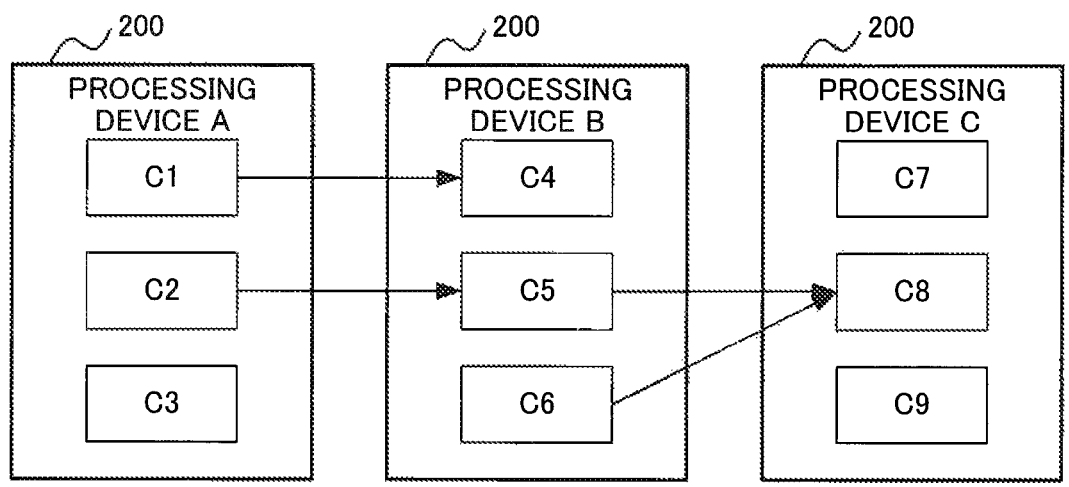
FIG. 3 is a diagram illustrating an example of a system configuration in the first exemplary embodiment of the present invention.

FIG. 3 is a diagram illustrating an example of a system configuration in the first exemplary embodiment of the present invention. In the example of FIG. 3, the system includes components "C1" to "C6" and these components are deployed on processing devices 200 "A", "B", and "C". A sign in " " indicates an identifier. For example, the component "C1" indicates a component of an identifier C1, and the processing device 200 "A" indicates a processing device 200 of an identifier A.

In FIG. 3, an arrow indicates a deployment sequence on the basis of dependencies. A component of the destination of the arrow depends on a component of the source of the arrow, and the component of the source of the arrow needs to be deployed prior to the component of the destination of the arrow.

Figure 4:
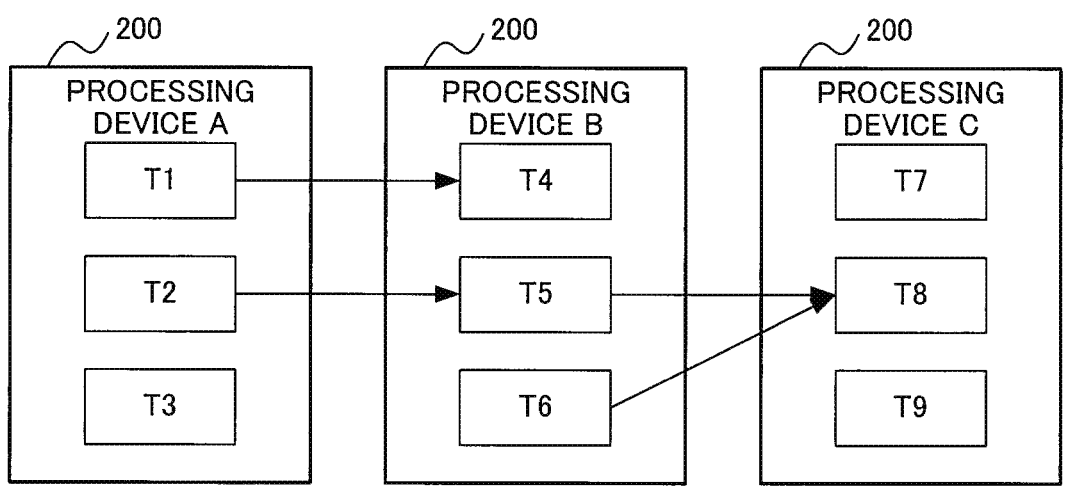
FIG. 4 is a diagram illustrating an example of an arrangement of deployment tasks in the first exemplary embodiment of the present invention.

FIG. 4 is a diagram illustrating an example of an arrangement of deployment tasks in the first exemplary embodiment of the present invention. In FIG. 4, deployment tasks "T1" to "T6" correspond to the components "C1" to "C6", respectively, and the processing devices 200 where the components "C1" to "C6" are deployed execute the corresponding deployment tasks "T1" to "T6", respectively.

The deployment device 100 includes a deployment control unit 110, a task information storing unit 120, an event processing unit 130, and an event information storing unit 140.

The deployment control unit 110 transmits a system construction request and deployment task information to the processing device 200.

The task information storing unit 120 stores task information 121. FIG. 5 is a diagram illustrating an example of task information 121 in the first exemplary embodiment of the present invention. The task information 121 of FIG. 5 corresponds to the system configuration of FIG. 3 and the arrangement of deployment tasks of FIG. 4.

The task information 121 includes an identifier of a deployment task, an identifier of the processing device 200 on which the deployment task is to be executed, a task state of the deployment task, a processing content, and an execution condition. For the identifier of the processing device 200, an FQDN (Fully Qualified Domain Name) of the processing device 200 is usable. For the task state, as a state of the deployment task, whether the deployment task has been executed ("executed"/"unexecuted") is set. For the processing content, a script, a program, or the like for installing and configuring a component is set. The execution condition indicates an identifier of another deployment task (dependent task) to be executed before executing the deployment task. For the execution condition, identifiers of a plurality of deployment tasks are settable.

An identifier of a deployment task, an identifier of the processing device 200, a processing content, and an execution condition in the task information 121 are previously set by an administrator or the like. It is possible that a task information acquiring unit, not illustrated, acquires these pieces of information from a storing unit outside the deployment device 100 and sets the acquired information as the task information 121.

The event processing unit 130 transfers a termination event (hereinafter, referred to simply as an event) of a deployment task received from a processing device 200 to another processing device 200 on the basis of event information 141.

The event information storing unit 140 stores the event information 141. FIG. 6 is a diagram illustrating an example of the event information 141 in the first exemplary embodiment of the present invention.

The even information 141 includes an identifier of a deployment task and a notification destination of an event of the deployment task. The notification destination indicates an identifier of the processing device 200 to which the event is transferred. For the notification destination, an FQDN of the processing device 200 is usable.

The processing device 200 includes a scheduler 210, a deployment task execution unit 220, and a task information storing unit 230.

The scheduler 210 determines an execution sequence of deployment tasks to be executed on the processing device 200.

The deployment task execution unit 220 executes each deployment task and deploys each component in accordance with an instruction from the scheduler 210.

The task information storing unit 230 stores task information 231. FIGS. 7 to 9 are diagrams each illustrating an example of the task information 231 in the first exemplary embodiment of the present invention. The pieces of task information 231 of FIGS. 7 to 9 correspond to the task information 121 of FIG. 5 and are examples of pieces of the task information 231 set on the processing devices 200 "A", "B", and "C", respectively.

The task information 231 includes an identifier of a deployment task, a task state of the deployment task, a processing content, an execution condition (dependent task), and a dependent task state. For the dependent task state, regarding each dependent task included in the execution condition, whether the dependent task has been executed ("executed"/"unexecuted") is set as a state of the dependent task.

The deployment device 100 may be a computer that includes a CPU (Central Processing Unit) and a storage medium storing a program and operates by being controlled on the basis of the program. The task information storing unit 120 and the event information storing unit 140 may be configured using individual storage media or one storage medium.

Next, an operation of the first exemplary embodiment of the present invention will be described.

In this description, a case in which a system of the configuration of FIG. 3 is constructed using the deployment tasks of FIG. 4 is described as an example. It is assumed that the task information storing unit 120 has stored the task information 121 of FIG. 5. For a task state in the task information storing unit 120, "unexecuted" is set as an initial state.

Initially, event notification destination registration processing in the first exemplary embodiment of the present invention will be described.

Figure 10:
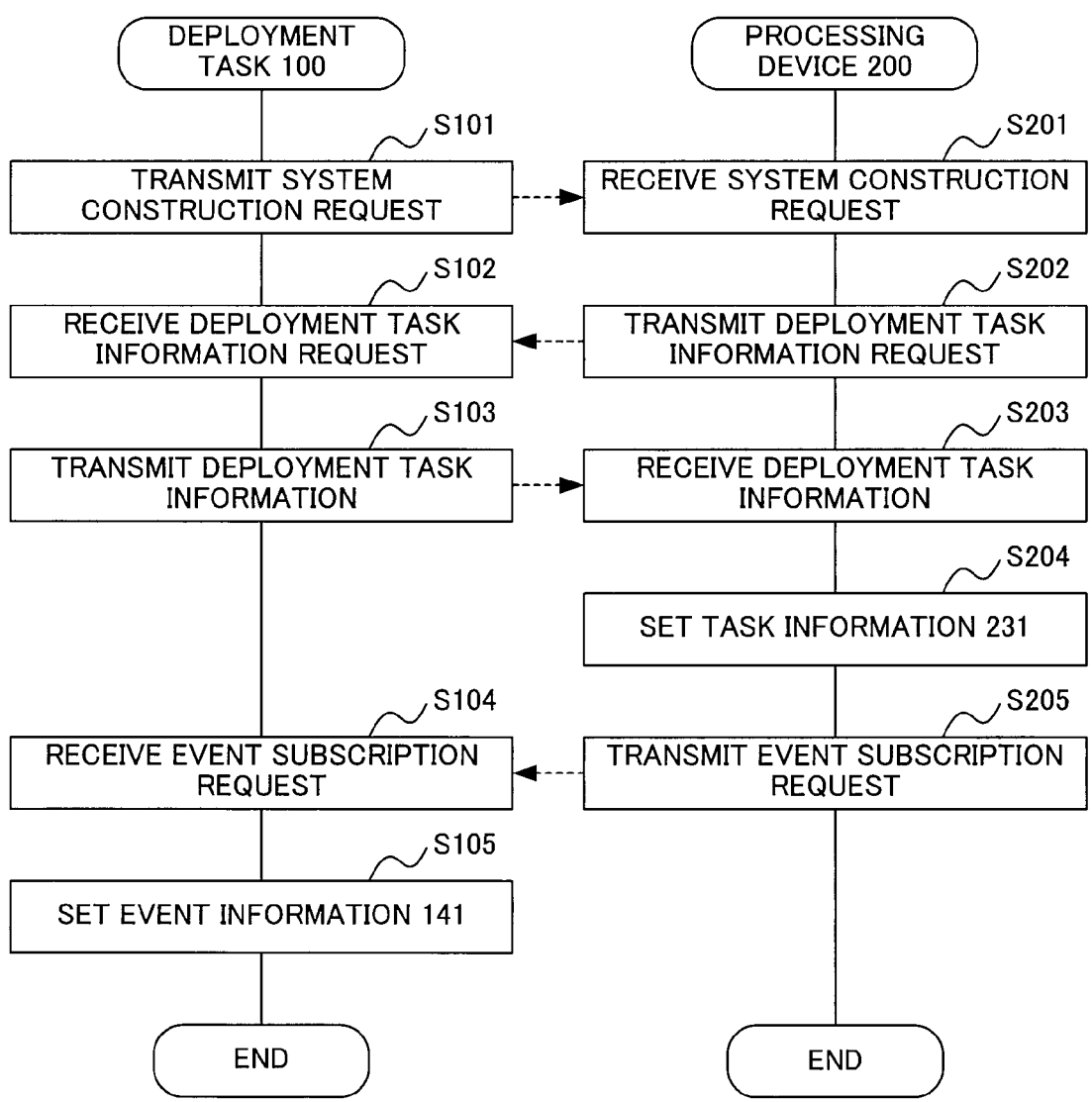
FIG. 10 is a flowchart illustrating event notification destination registration processing in the first exemplary embodiment of the present invention.

FIG. 10 is a flowchart illustrating the event notification destination registration processing in the first exemplary embodiment of the present invention.

The deployment control unit 110 of the deployment device 100 refers to the task information 121 and transmits a system construction request to each processing device 200 on which a deployment task is to be executed (step S101).

When receiving the system construction request (step S201), the scheduler 210 of the processing device 200 transmits a deployment task information request to the deployment control unit 110 and requests deployment task information to be executed on the processing device 200 (step S202).

When receiving the deployment task information request (step S102), the deployment control unit 110 of the deployment device 100 refers to the task information 121 and transmits deployment task information to the processing device 200 (step S103). The deployment control unit 110 transmits, as the deployment task information, an identifier of a deployment task to be executed on the processing device 200, a processing content, and an execution condition.

The deployment device 100 transmits, for example, deployment task information including deployment tasks "T1" to "T3" extracted from the task information 121 of FIG. 5 to the processing device 200 "A". In the same manner, the deployment device 100 transmits deployment task information including deployment tasks "T4" to "T6" to the processing device 200 "B". Further, the deployment device 100 transmits deployment task information including deployment tasks "T7" to "T9" to the processing device 200 "C".

When receiving the deployment task information (step S203), the scheduler 210 of the processing device 200 sets the received deployment task information as task information 231 (step S204). For a task state and a dependent task state of the task information 231, "unexecuted" is set as an initial state.

For example, the processing devices 200 "A", "B", and "C" set pieces of task information 231 as in FIGS. 7 to 9, respectively.

The scheduler 210 refers to the task information 231 and transmits an event subscription request including an identifier of a deployment task (dependent task) indicated as an execution condition of each deployment task to the deployment device 100 (step S205).

For example, the processing device 200 "B" transmits an event subscription request including identifiers "T1" and "T2" of deployment tasks to the deployment device 100 on the basis of the task information 231 of FIG. 8. The processing device 200 "C" transmits an event subscription request including identifiers "T5" and "T6" of deployment tasks to the deployment device 100 on the basis of the task information 231 of FIG. 9.

When receiving the event subscription request (step S104), the event processing unit 130 of the deployment device 100 sets event information 141 (step S105). The event processing unit 130 sets an identifier of a deployment task included in the event subscription request and an identifier of the processing device 200 of the transmission source of the event subscription request as an identifier of a deployment task of the event information 141 and a notification destination, respectively.

The deployment device 100 sets, for example, the event information 141 as in FIG. 6.

In this case, the event processing unit 130 sets the event information 141 on the basis of an event subscription request, but the event processing unit 130 may generate the event information 141 on the basis of the task information 121.

Next, deployment processing in the first exemplary embodiment of the present invention will be described.

Figure 11:
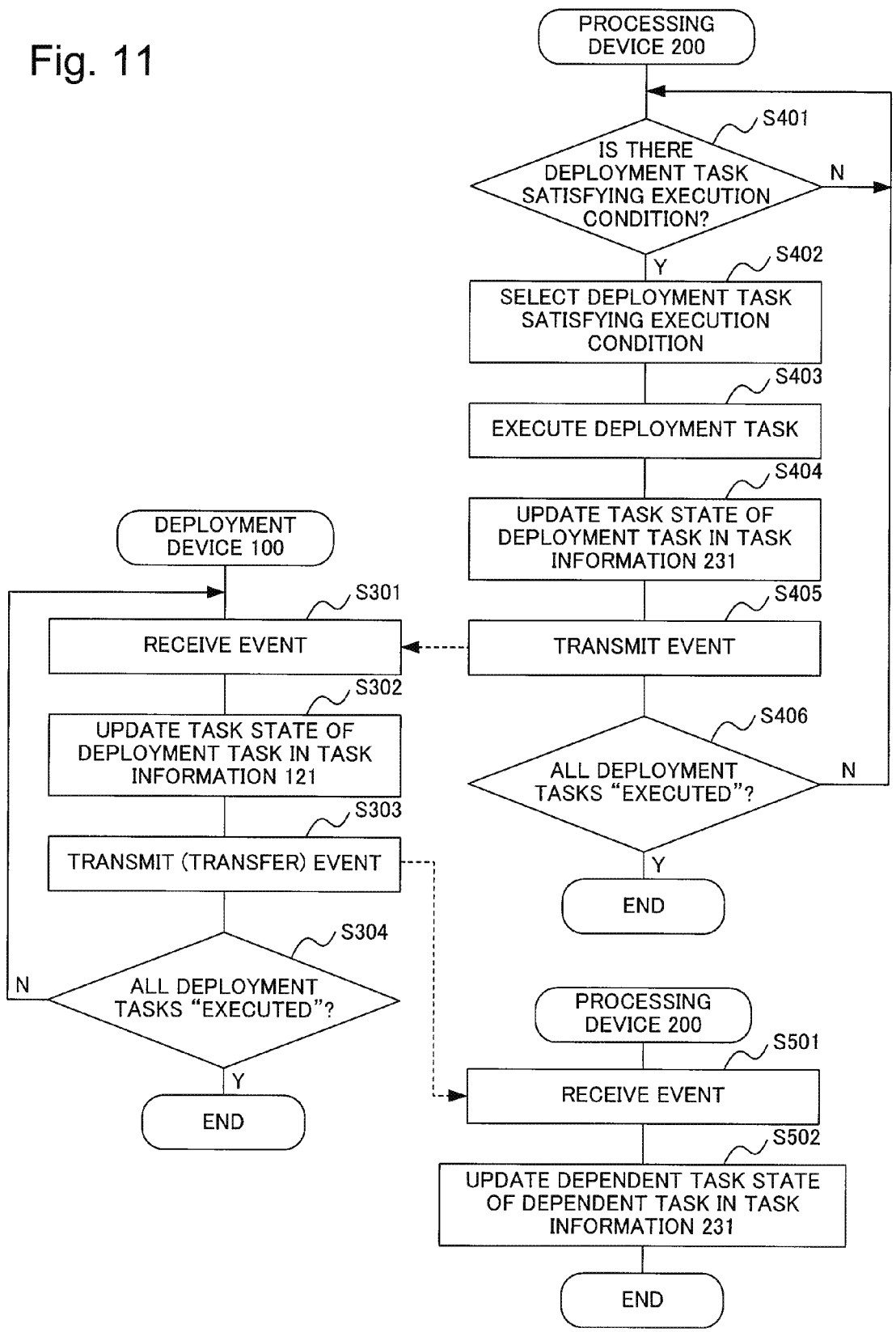
FIG. 11 is a flowchart illustrating deployment processing in the first exemplary embodiment of the present invention.
Figure 12:
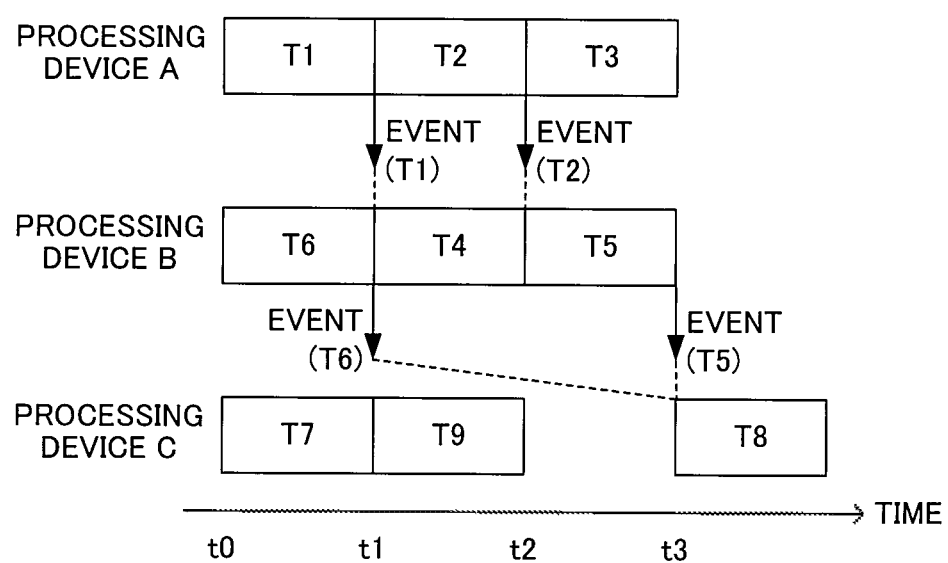
FIG. 12 is a diagram illustrating an execution example of deployment tasks in the first exemplary embodiment of the present invention.

FIG. 11 is a flowchart illustrating the deployment processing in the first exemplary embodiment of the present invention. FIG. 12 is a diagram illustrating an execution example of deployment tasks in the first exemplary embodiment of the present invention.

The scheduler 210 refers to task information 231 and determines whether there is a deployment task satisfying an execution condition among deployment tasks whose task state is "unexecuted" (step S401). When dependent task states of all the dependent tasks included in the execution condition are "executed", the scheduler 210 determines that the execution condition is satisfied.

When there is no deployment task satisfying the execution condition (step S401/N), the scheduler 210 repeats processing from step S401.

When there is a deployment task satisfying the execution condition (step S401/Y), the scheduler 210 selects one deployment task satisfying the execution condition (step S402). When there are a plurality of deployment tasks each satisfying the execution condition, the scheduler 210 selects the deployment tasks, for example, in order of identifiers of the deployment tasks. The scheduler 210 instructs the deployment task execution unit 220 to execute the selected deployment task, together with a processing content of the deployment task.

When there are a plurality of deployment tasks each satisfying the execution condition, it is possible for the scheduler 210 to select deployment tasks from the plurality of deployment tasks in a range of the processing performance of the processing device 200 and to cause the deployment task execution unit 220 to execute the selected deployment tasks at the same time.

The deployment task execution unit 220 executes, in accordance with the processing content of the extracted deployment task, the deployment task (step S403). The deployment task execution unit 220 may acquire a file necessary to execute a script or a command set in the processing content from a repository or the like, not illustrated, outside the processing device 200. When the deployment task has been terminated normally, the deployment task execution unit 220 notifies the scheduler 210 of the termination of the deployment task.

The scheduler 210 updates the task state of the terminated deployment task in the task information 231 as "executed" (step S404).

For example, at a time t0 of FIG. 12, in the task information 231 of FIG. 7, a dependent task is not assigned for each of execution conditions of deployment tasks "T1", "T2", and "T3", and therefore the scheduler 210 of the processing device 200 "A" determines that these deployment tasks each satisfy the execution condition. The scheduler 210 of the processing device 200 "A" transmits an instruction for executing the deployment task "T1". The deployment task execution unit 220 of the processing device 200 "A" executes the deployment task "T1" and installs a component "C1".

In the task information 231 of FIG. 8, a dependent task is not assigned for an execution condition of a deployment task "T6", and therefore the scheduler 210 of the processing device 200 "B" determines that the deployment task "T6" satisfies the execution condition. The scheduler 210 of the processing device 200 "B" transmits an instruction for executing the deployment task "T6". The deployment task execution unit 220 of the processing device 200 "B" executes the deployment task "T6" and installs a component "C6".

In the task information 231 of FIG. 9, a dependent task is not assigned for each of execution conditions of deployment tasks "T7" and "T9", and therefore the scheduler 210 of the processing device 200 "C" determines that these deployment tasks each satisfy the execution condition. The scheduler 210 of the processing device 200 "C" transmits an instruction for executing the deployment task "T7". The deployment task execution unit 220 of the processing device 200 "C" executes the deployment task "T7" and installs a component "C7".

When a deployment task has not been terminated normally, the scheduler 210 may execute predetermined exceptional processing.

The scheduler 210 transmits an event including an identifier of the terminated deployment task to the deployment device 100 (step S405).

For example, at a time t1, the schedulers 210 of the processing devices 200 "A", "B", and "C" transmit events including identifiers "T1", "T6", and "T7" of deployment tasks to the deployment device 100, respectively.

When receiving the event from the processing device 200 (step S301), the event processing unit 130 of the deployment device 100 updates the task state of the deployment task indicated by the event in the task information 121 as "executed" (step S302).

The event processing unit 130 updates, for example, the task states of the deployment tasks "T1", "T6", and "T7" in the task information 121 as "executed" as in FIG. 5.

The event processing unit 130 refers to the event information 141 and transmits (transfers) the event to the process device 200 of a notification destination corresponding to an identifier of a deployment task included in the event (step S303).

The event processing unit 130 transmits, for example, an event including an identifier "T1" of a deployment task to the processing device 200 "B" on the basis of the event information 141 of FIG. 6. Further, the event processing unit 130 transmits an event including an identifier "T6" of a deployment task to the processing device 200 "C".

When receiving the event from the deployment device 100 (step S501), the scheduler 210 of the processing device 200 updates the task state of a dependent task corresponding to the identifier of the deployment task included in the event in the task information 231 as "executed" (step S502).

The scheduler 210 of the processing device 200 "B" updates, for example, the dependent task state of the dependent task "T1" in the task information 231 as "executed" as in FIG. 8. Further, the scheduler 210 of the processing device 200 "C" updates the dependent task state of the dependent task "T6" in the task information 231 as "executed" as in FIG. 9.

Thereafter, the event processing unit 130 repeats processing of steps S301 to S303 until the task states of all the deployment tasks included in the task information 121 become "executed" (step S304).

The scheduler 210 repeats processing of steps S401 to S405 until the task states of all the deployment tasks included in the task information 231 become "executed" (step S406). Further, the schedule 210 executes processing of steps S501 and S502 every time receiving an event.

For example, at a time t1 of FIG. 12, the processing device 200 "A" executes a deployment task "T2" satisfying an execution condition and installs a component "C2".

With respect to a deployment task "T4" of the processing device 200 "B", the dependent task state of the dependent task "T1" is "executed" and an execution condition is satisfied. The processing device 200 "B" executes the deployment task "T4" and installs a component "C4".

The processing device 200 "C" executes a deployment task "T9" satisfying an execution condition and installs a component "C9".

At a time t2 of FIG. 12, the schedulers 210 of the processing devices 200 "A", "B", and "C" transmit events including identifiers "T2", "T4", and "T9" of deployment tasks to the deployment device 100, respectively. The event processing unit 130 of the deployment device 100 transmits the event including the identifier "T2" of the deployment task to the processing device 200 "B".

Then, the processing device 200 "A" executes a deployment task "T3" satisfying an execution condition and installs a component "C3".

With respect to a deployment task "T5" of the processing device 200 "B", the dependent task state of the dependent task "T5" is "executed" and an execution condition is satisfied. The processing device 200 "B" executes the deployment task "T5" and installs a component "C5".

With respect to a deployment task "T8" of the processing device 200 "C", the dependent task state of a dependent task "T5" is "unexecuted" and an execution condition is not satisfied. The processing device 200 "C" executes no deployment task.

At a time t3 of FIG. 12, the schedulers 210 of the processing devices 200 "A" and "B" transmit events including identifiers "T3" and "T5" of deployment tasks to the deployment device 100, respectively. The event processing unit 130 of the deployment device 100 transmits the event including the identifier "T5" of the deployment task to the processing device 200 "C".

With respect to a deployment task "T8" of the processing device 200 "C", the dependent task states of the dependent tasks "T5" and "T6" are "executed" and an execution condition is satisfied. The processing device 200 "C" executes the deployment task "T8" and installs a component "C8".

Thereby, as illustrated in FIG. 3, the components "C1" to "C6" configuring the system are deployed on the processing devices 200 "A", "B", and "C", and the construction of the system is completed.

As described above, the operation of the first exemplary embodiment of the present invention is completed.

In the first exemplary embodiment of the present invention, a case in which one deployment task is used for each component as illustrated in FIG. 3 and FIG. 4 has been described as an example. However, for each component, different deployment tasks such as a deployment task for installing a component and a deployment task for configuring the component are usable. In this case, dependencies (execution condition) among a plurality of deployment tasks including these deployment tasks may be defined.

Figure 1:
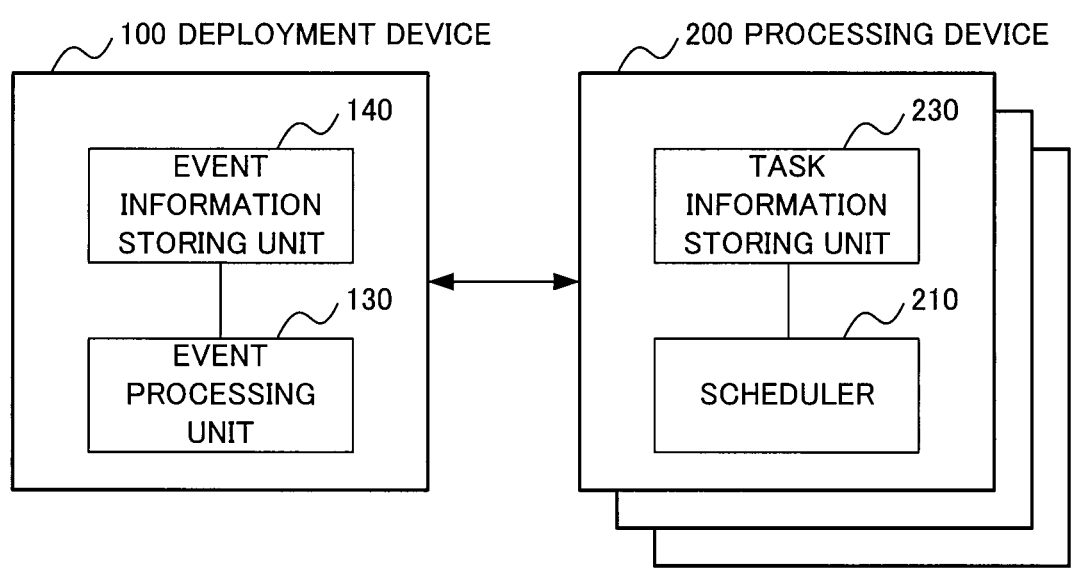
FIG. 1 is a block diagram illustrating a characteristic configuration of a first exemplary embodiment of the present invention.

Next, a characteristic configuration of the first exemplary embodiment of the present invention will be described. FIG. 1 is a block diagram illustrating a characteristic configuration of the first exemplary embodiment of the present invention.

Referring to FIG. 1, an information system includes a deployment device 100 and a plurality of processing devices 200.

Each of the plurality of processing devices 200 includes a task information storing unit 230 and a scheduler 210.

A plurality of software components of the system are deployed on the plurality of processing devices 200. A plurality of deployment tasks for deploying the plurality of software components are executed in the plurality of processing devices 200. The task information storing unit 230 stores task information 231 that indicates an execution condition for each of identifiers of one or more deployment tasks to be executed on the processing device 200 among the plurality of deployment tasks. The execution condition includes an identifier of another deployment task to be executed before executing the deployment task.

The scheduler 210 determines whether there is a deployment task satisfying an execution condition among the one or more deployment tasks included in the task information 231 on the basis of a termination event of a deployment task received from the deployment device 100. The scheduler 210 executes, when there is a deployment task satisfying an execution condition, the deployment task, and transmits, when the deployment task is terminated, a termination event of the deployment task to the deployment device 100.

The deployment device 100 includes an event information storing unit 140 and an event processing unit 130.

The event information storing unit 140 stores event information 141 that indicates, for each of identifiers of the plurality of deployment tasks, an identifier of the processing device 200 to which a termination event of the deployment task is to be transmitted.

The event processing unit 130 transmits, when receiving a termination event of a deployment task from any one of the plurality of processing devices 200, the termination event to the processing device 200 to which the termination event of the deployment task is to be transmitted, referring to the event information 141.

According to the first exemplary embodiment of the present invention, it is possible to construct a system in which a plurality of software components having dependencies are deployed dispersedly on a plurality of processing devices.

The reason is that the processing device 200 and the deployment device 100 execute the following processing. The processing device 200 determines, on the basis of a termination event of a deployment task, whether there is a deployment task satisfying an execution condition in task information 231. When there is a deployment task satisfying an execution condition, the processing device 200 executes the deployment task and transmits a termination event of the deployment task to the deployment device 100. The deployment device 100 refers to event information 141 and transmits the termination event of the deployment task to the processing device 200 of a notification destination.

This makes it possible to construct a system in which a plurality of software components having dependencies are deployed dispersedly on a plurality of processing devices without defining a workflow by an administrator or the like.

Further, this makes it possible to reduce operations of the administrator or the like and cost associated with the construction of a system.

Second Exemplary Embodiment

Next, a second exemplary embodiment of the present invention will be described.

The second exemplary embodiment of the present invention is different from the first exemplary embodiment of the present invention in that a priority is provided to each of deployment tasks.

Initially, a configuration of the second exemplary embodiment of the present invention is described below.

Figure 13:
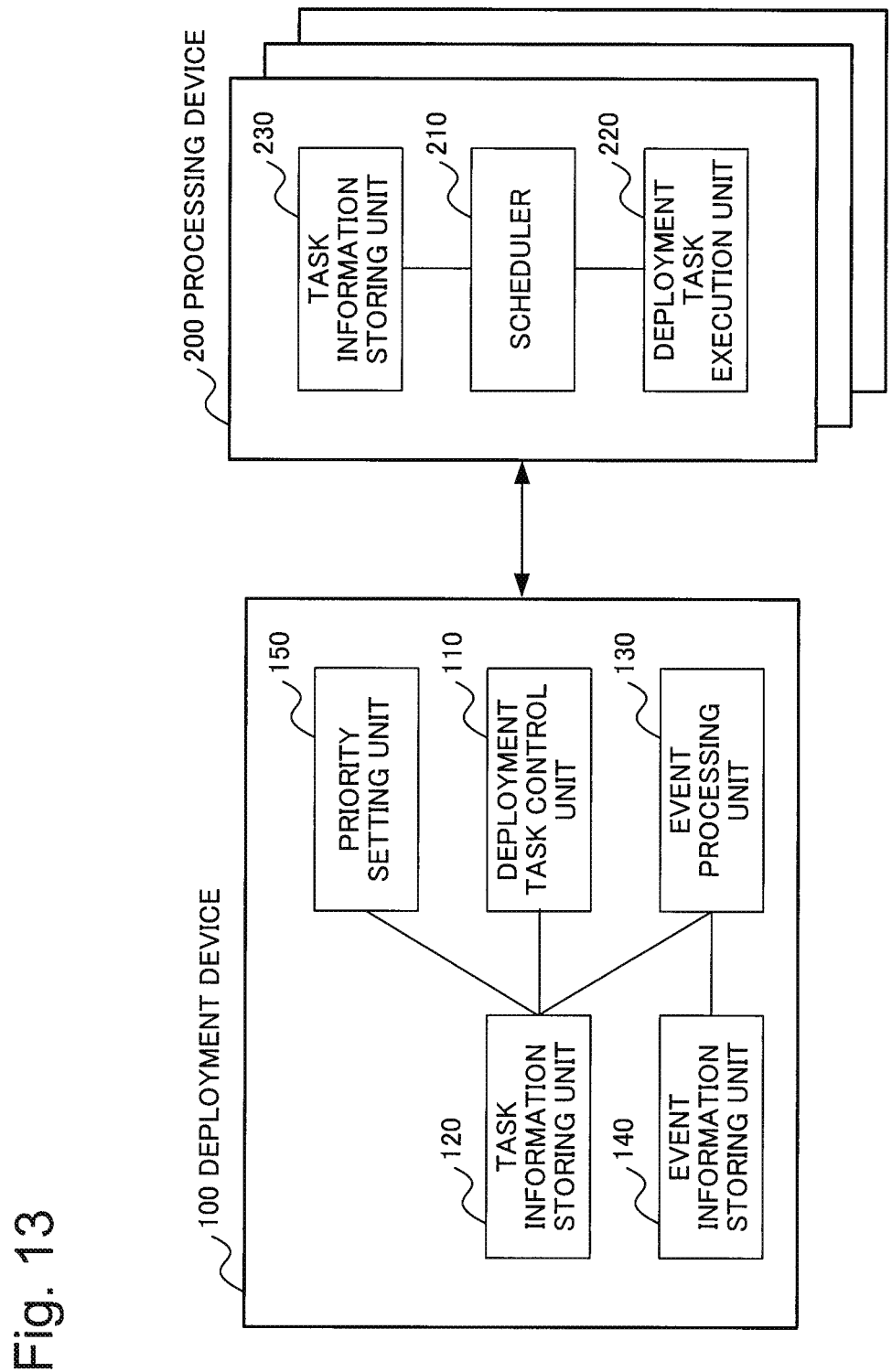
FIG. 13 is a block diagram illustrating a configuration of an information processing system in a second exemplary embodiment of the present invention.

FIG. 13 is a block diagram illustrating a configuration of an information processing system in the second exemplary embodiment of the present invention. A deployment device 100 includes a priority setting unit 150 in addition to the configuration of the deployment device 100 of the first exemplary embodiment of the present invention.

The priority setting unit 150 provides priorities to deployment tasks, respectively, set in task information 121.

FIG. 14 is a diagram illustrating an example of the task information 121 in the second exemplary embodiment of the present invention. The task information 121 includes priorities in addition to the contents of the task information 121 of the first exemplary embodiment of the present invention. Herein, it is assumed that with an increase in the value of a priority, a priority of a deployment task increases.

FIGS. 15 to 17 are diagrams each illustrating an example of task information 231 in the second exemplary embodiment of the present invention. The task information 231 also includes priorities in addition to the contents of the task information 231 of the first exemplary embodiment of the present invention.

Next, an operation of the second exemplary embodiment of the present invention will be described.

Initially, event notification destination registration processing in the second exemplary embodiment of the present invention is described.

Before step S101 in FIG. 10 is executed, the priority setting unit 150 sets a priority for each deployment task included in the task information 121.

For a priority of a deployment task, for example, a value, in which 1 is added to the total number of other deployment tasks to be executed after the deployment task obtained by tracing dependencies among the deployment tasks, is set.

For example, in the task information 121 of FIG. 14, there is a deployment task "T4" depending on a deployment task "T1", and therefore a priority of the deployment task "T1" is 2. There is a deployment task "T5" depending on a deployment task "T2" and there is a deployment task "T8" depending on the deployment task "T5", and therefore a priority of the deployment task "T8" is 2. There is no deployment task depending on a deployment task "T3", and therefore a priority of the deployment task "T3" is 1. The priority setting unit 150 sets priorities as in FIG. 14 on the basis of an execution condition (dependent task) of each task in the task information 121 of FIG. 14.

A priority of a deployment task may be set on the basis of another piece of information such as a processing content of the deployment task and the like.

In step S103 in FIG. 10, the deployment control unit 110 transmits a priority in addition to an identifier of a deployment task to be executed on the processing device 200, a processing content, and an execution condition, as deployment task information. In step S204, the scheduler 210 sets the received deployment task information as the task information 231.

The processing devices 200 "A", "B", and "C" set, for example, task information 231 as in FIGS. 15 to 17, respectively.

Next, deployment processing in the second exemplary embodiment of the present invention will be described.

In step S402 in FIG. 11, the scheduler 201 refers to the task information 231, selects, when there are a plurality of deployment tasks each satisfying an execution condition, a deployment task in descending order of priority, and instructs the deployment task execution unit 220 to execute the deployment task.

It is possible that the scheduler 210 selects deployment tasks from the plurality of deployment tasks in descending order of priority in a range of the processing performance of the processing device 200 and causes the deployment task execution unit 220 to execute the selected deployment tasks at the same time.

Figure 18:
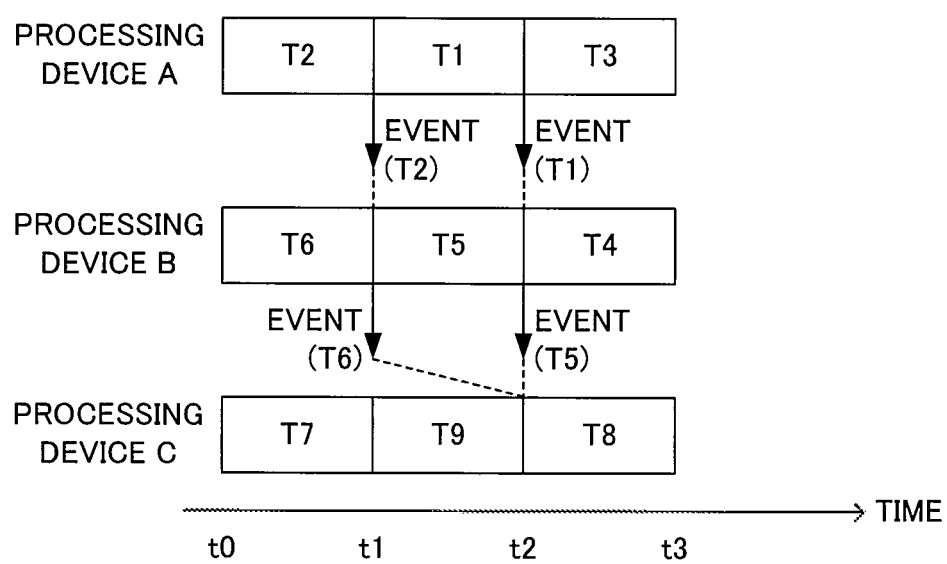
FIG. 18 is a diagram illustrating an execution example of deployment tasks in the second exemplary embodiment of the present invention.

FIG. 18 is a diagram illustrating an execution example of deployment tasks in the second exemplary embodiment of the present invention.

For example, at a time t0 of FIG. 18, the processing device 200 "A" executes, among deployment tasks "T1", "T2", and "T3" each satisfying an execution condition, the deployment task "T2" having the highest priority on the basis of the task information 231 of FIG. 15 and installs a component "C2".

The processing device 200 "B" executes a deployment task "T6" satisfying an execution condition on the basis of the task information 231 of FIG. 16 and installs a component "C6".

The processing device 200 "C" executes, among deployment tasks "T7" and "T9" each satisfying an execution condition, the deployment task "T7" on the basis of the task information 231 of FIG. 17 and installs a component "C7".

Then, at a time t1 of FIG. 18, the processing device 200 "A" executes, among the deployment tasks "T1" and "T3" each satisfying the execution condition, the deployment task "T1" having a higher priority and installs a component "C1".

The processing device 200 "B" executes a deployment task "T5" satisfying an execution condition and installs a component "C5".

The processing device 200 "C" executes the deployment task "T9" satisfying the execution condition and installs a component "C9".

Then, at a time t2 of FIG. 18, the processing device 200 "A" executes the deployment task "T3" satisfying the execution condition and installs a component "C3".

The processing device 200 "B" executes a deployment task "T4" satisfying an execution condition and installs a component "C4".

The processing device 200 "C" executes a deployment task "T8" satisfying an execution condition and installs a component "C8".

As described above, the operation of the second exemplary embodiment of the present invention is completed.

According to the second exemplary embodiment of the present invention, it is possible to shorten a time necessary to construct a system, compared with the first exemplary embodiment of the present invention. The reason is that the scheduler 210 transmits an instruction for an execution from a deployment task having a highest priority among deployment tasks each satisfying an execution condition.

Third Exemplary Embodiment

Next, a third exemplary embodiment of the present invention will be described.

The third exemplary embodiment of the present invention is different from the first exemplary embodiment of the present invention in that, during execution of a deployment task, additional information generated by executing a dependent task of the deployment task is used.

A configuration of an information processing system in the third exemplary embodiment of the present invention is the same as in the first exemplary embodiment (FIG. 2) of the present invention.

Next, an operation of the third exemplary embodiment of the present invention will be described.

Event notification destination registration processing in the third exemplary embodiment of the present invention is the same as in the first exemplary embodiment (FIG. 10) of the present invention.

Next, deployment processing in the third exemplary embodiment of the present invention will be described.

In step S402 of FIG. 11, the scheduler 210 edits a processing content of a selected deployment task using additional information generated by a dependent task of the deployment task. The additional information of the dependent task is, for example, information determined or collected in the processing device 200 during execution of the dependent task. The additional information is notified, as described later, from the processing device 200 in which the dependent task has been executed to the processing device 200 in which the deployment task depending on the dependent task is to be executed, by being included in an event.

The additional information and the editing processing may be any information and any processing as long as the information is generated by executing a dependent task and the processing relates to a deployment (installation and setting) using the information. It is assumed that, for example, it is necessary to set, for a file related to a component, an IP (Internet Protocol) address of the processing device 200 in which a dependent task has been executed (a depending component has been deployed). In this case, the scheduler 210 uses the IP address as additional information and replaces a part of the file related to the component with the IP address as editing processing.

The scheduler 210 instructs, with the edited processing content, the deployment task execution unit 220 to execute a deployment task.

In step S403, when the deployment task execution unit 220 executes the deployment task, additional information of the deployment task is generated. The additional information is generated, for example, in accordance with a logic included in a script or a program specified by a processing content of the deployment task and output as a return value of the script or the program or a log file.

In step S405, the scheduler 210 transmits an event including the additional information generated in step S403 to the deployment device 100.

In step S303, the event processing unit 130 transmits (transfers), to the processing device 200 of a notification destination corresponding to an identifier of a deployment task included in the event, an event including the additional information generated in step S403.

In step S501, the scheduler 210 receives the event including the additional information of the dependent task from the deployment device 100. The additional information of the dependent task is used in step S402 described above.

As described above, the operation of the third exemplary embodiment of the present invention is completed.

According to the third exemplary embodiment of the present invention, it is possible to construct a more complex system than the configuration of the first exemplary embodiment of the present invention. The reason is that the processing device 200 executes the following processing. The processing device 200 transmits a termination event of a deployment task by including additional information generated by executing the deployment task and edits, using the received additional information included in the termination event of the deployment task, a deployment task in which the deployment task is included as an execution condition. This makes it possible to use information determined during execution of a deployment task in order to install or set another deployment task depending on the deployment task.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2013-086679, filed on Apr. 17, 2013, the disclosure of which is incorporated herein in its entirety by reference.

REFERENCE SIGNS LIST

100 Deployment device
110 Deployment control unit
120 Task information storing unit
121 Task information
130 Event processing unit
140 Event information storing unit
141 Event information
150 Priority setting unit
200 Processing device
210 Scheduler
220 Deployment task execution unit
230 Task information storing unit
231 Task information

What is claimed is:

1. An information processing system comprising:
a plurality of processing devices each including a memory storing instructions; and one or more processors configured to execute the instructions to:
store task information that indicates, for each of identifiers of one or more deployment tasks to be executed on the processing device among a plurality of deployment tasks for deploying a plurality of software components of a system respectively, an execution condition including an identifier of a dependent deployment task to be executed before executing a deployment task of the corresponding identifier, the plurality of deployment tasks being executed in the plurality of processing devices on which the plurality of software components are deployed,
transmit, to a deployment device, an event subscription request including an identifier of the dependent deployment task included in the execution condition of the task information, and
determine whether there is a deployment task satisfying the execution condition among the one or more deployment tasks included in the task information on the basis of a termination event of the dependent deployment task received from the deployment device, execute, when there is the deployment task satisfying the execution condition, the deployment task, and transmit, when the deployment task is terminated, a termination event of the deployment task to the deployment device; and
the deployment device including a memory storing instructions; and one or more processors configured to execute the instructions to:
store event information that indicates, for each of identifiers of the plurality of deployment tasks, an identifier of a processing device to which a termination event of the deployment task of the corresponding identifier is to be transmitted based on the event subscription request; and
transmit, when receiving a termination event of a deployment task from any one of the plurality of processing devices, the received termination event to a processing device to which the termination event of the deployment task is to be transmitted, referring to the event information.

2. The information processing system according to claim 1, wherein the task information further indicates, for each of the identifiers of the one or more deployment tasks, a priority of the deployment task of the corresponding identifier, and a deployment task having a highest priority among deployment tasks each satisfying the execution condition is executed.

3. The information processing system according to claim 2, wherein the priority of the deployment task is determined on the basis of a total number of other deployment tasks to be executed after the deployment task.

4. The information processing system according to claim 1, wherein the one or more processors of the processing device configured to further execute the instructions to: transmit a termination event of a deployment task that is transmitted to the deployment device by including additional information generated by executing the deployment task and edit, using additional information included in a termination event of another deployment task received from the deployment device, a deployment task having the execution condition including the another deployment task.

5. The information processing system according to claim 1, wherein the one or more processors of the deployment device configured to further execute the instructions to: set, for the identifier of the deployment task included in the event subscription request, an identifier of a processing device of a transmission source of the event subscription request in the event information.

6. An deployment method comprising:

in each of a plurality of processing devices on which a plurality of software components of a system are deployed, storing task information that indicates, for each of identifiers of one or more deployment tasks to be executed on the processing device among a plurality of deployment tasks for deploying the plurality of software components respectively, an execution condition including an identifier of a dependent deployment task to be executed before executing a deployment task of the corresponding identifier, in each of the plurality of processing devices, transmitting, to a deployment device, an event subscription request including an identifier of the dependent deployment task included in the execution condition of the task information, in the deployment device, storing event information that indicates, for each of identifiers of the plurality of deployment tasks, an identifier of a processing device to which a termination event of the deployment task of the corresponding identifier is to be transmitted based on the event subscription request, in each of the plurality of processing devices, determining whether there is a deployment task satisfying the execution condition among the one or more deployment tasks included in the task information on the basis of a termination event of the dependent deployment task received from a deployment device, executing, when there is the deployment task satisfying the execution condition, the deployment task, and transmitting, when the deployment task is terminated, a termination event of the deployment task to the deployment device; and in the deployment device, transmitting, when receiving a termination event of a deployment task from any one of the plurality of processing devices, the received termination event to a processing device to which the termination event of the deployment task is to be transmitted, referring to the event information.

7. An information processing system comprising:

a plurality of processing devices each including a task information storing means for storing task information that indicates, for each of identifiers of one or more deployment tasks to be executed on the processing device among a plurality of deployment tasks for deploying a plurality of software components of a system respectively, an execution condition including an identifier of a dependent deployment task to be executed before executing a deployment task of the corresponding identifier, the plurality of deployment tasks being executed in the plurality of processing devices on which the plurality of software components are deployed, event subscription means for transmitting, to a deployment device, an event subscription request including an identifier of the dependent deployment task included in the execution condition of the task information, and a scheduler means for determining whether there is a deployment task satisfying the execution condition among the one or more deployment tasks included in the task information on the basis of a termination event of the dependent deployment task received from a deployment device, executing, when there is the deployment task satisfying the execution condition, the deployment task, and transmitting, when the deployment task is terminated, a termination event of the deployment task to the deployment device; and the deployment device including an event information storing means for storing event information that indicates, for each of identifiers of the plurality of deployment tasks, an identifier of a processing device to which a termination event of the deployment task of the corresponding identifier is to be transmitted based on the event subscription request, and an event processing means for transmitting, when receiving a termination event of a deployment task from any one of the plurality of processing devices, the received termination event to a processing device to which the termination event of the deployment task is to be transmitted, referring to the event information.

* * * * *